United States Patent [19]

Larsson et al.

[11] Patent Number: 5,299,235
[45] Date of Patent: Mar. 29, 1994

[54] TIME SYNCHRONIZATION OF A RECEIVER IN A DIGITAL RADIO TELEPHONE SYSTEM

[75] Inventors: Gustav Larsson; Karim Jamal, both of Stockholm, Sweden

[73] Assignee: Telefonaktiebolaget L M Ericsson, Stockholm, Sweden

[21] Appl. No.: 757,296

[22] Filed: Sep. 10, 1991

[51] Int. Cl.$^5$ .............................. H04L 7/00
[52] U.S. Cl. ................... 375/114; 370/104.1
[58] Field of Search ............ 375/13, 83, 85, 86, 375/96, 97, 99, 102, 114, 116; 455/137, 138, 139; 370/104.1

[56] References Cited

U.S. PATENT DOCUMENTS

| 4,032,885 | 6/1977 | Roth | 375/116 |
|---|---|---|---|
| 4,450,558 | 5/1984 | Hampton et al. | 370/106 |
| 4,507,779 | 3/1985 | Barner, Jr. et al. | 370/100 |
| 4,653,049 | 3/1987 | Shinmyo | 370/95 |
| 4,692,931 | 9/1987 | Ohsawa | 375/106 |
| 4,694,473 | 9/1987 | Etoh | 375/116 |
| 4,697,276 | 9/1987 | Skoog | 375/114 |
| 4,807,248 | 2/1989 | Pyatt et al. | 375/1 |
| 4,829,543 | 5/1989 | Borth et al. | 375/96 |
| 4,847,869 | 7/1989 | Labedz et al. | 375/102 |
| 4,972,506 | 11/1990 | Uddenfeldt | 455/33 |
| 4,984,238 | 1/1991 | Watanabe et al. | 370/105.1 |
| 5,008,953 | 4/1991 | Dahlin et al. | 455/33 |
| 5,031,193 | 7/1991 | Atkinson et al. | 375/96 |
| 5,134,635 | 7/1992 | Hong et al. | 375/94 |

FOREIGN PATENT DOCUMENTS

85/04999 11/1985 PCT Int'l Appl. .
2156189 10/1985 United Kingdom .

*Primary Examiner*—Stephen Chin
*Assistant Examiner*—Young Tse
*Attorney, Agent, or Firm*—Burns, Doane, Swecker & Mathis

[57] ABSTRACT

A method for improving time synchronization of digital data signals in receivers by using more than one known data sequence to provide a plurality of timing recovery functions and based on these, one or more optimal sampling points. By using existing data sequences in each frame, the disclosed method provides improved time synchronization without increasing transmission overhead.

24 Claims, 4 Drawing Sheets

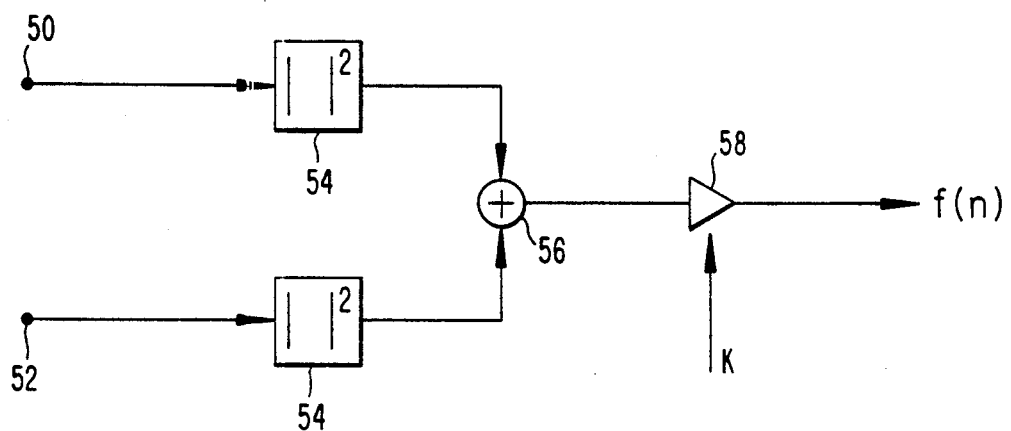
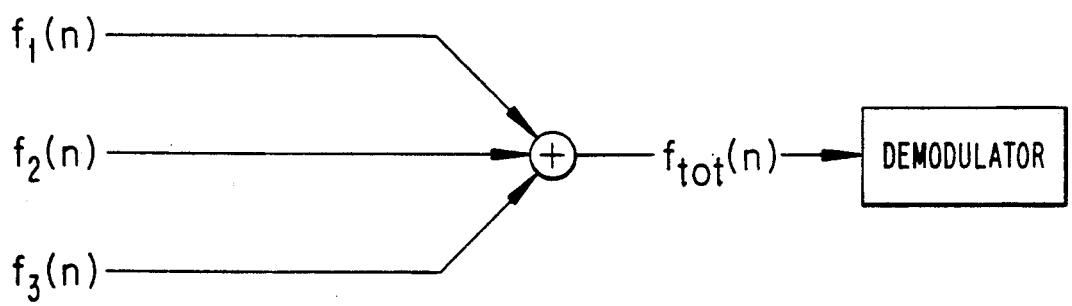

TIME SYNCHRONIZATION OF A RECEIVER IN A DIGITAL RADIO TELEPHONE SYSTEM

FIELD OF THE INVENTION

The present invention relates to mobile, cellular telephone radio systems for transmitting digital data signals. More specifically, the invention relates to an apparatus and method for improving the time synchronization of signals prior to demodulation in the receiver of either a base station or a mobile station of a such a system.

BACKGROUND OF THE INVENTION

In mobile telephone radio systems operating according to the time division multiple access (TDMA) principle, data is transmitted between a base station and one or more mobile stations. This data is transmitted between the various stations at a given rate, e.g., 48.6 Kbits/s. Typically, the data is sent in 40 ms frames with each frame comprising a plurality of equal duration time slots. In this manner, a mobile station will transmit or receive bursts of information which are each allotted a time slot in a frame, whereby a plurality of mobile stations can transmit or receive over a given radio channel. In order to decode the transmitted information a receiver, either in the base station or mobile station, must both deinterleave the time slots and demodulate the data therein.

However, due to the relatively short time span of each time slot and the nature of electromagnetic wave propagation in relation to a given topology, these signals are subject to time dispersion which effectively shifts the time position of the sampled signal. Since the information embedded in each time slot is located in specific fields of predetermined length, it is imperative that the receiver recognize exactly which time segment of the signal it is operating on. Thus in order for the receiver to correctly demodulate the transmitted signal, it must first synchronize the signal to obtain a reference point from which to demodulate.

Typically, this synchronization has been accomplished by including a synchronization sequence, which is known to the receiver, in the transmitted signal. At the receiver a sampled version of the received signal is correlated with the known synchronization sequence to determine where the sequence is most likely located in the sampled signal. This position is then used as the reference point for demodulating the signal.

SUMMARY OF THE INVENTION

The present invention provides an improved method and apparatus for performing the time synchronization of the transmitted signal by using two or more known data sequences to determine the relative time position of each field in each time slot prior to demodulation. Another object of the invention is to provide improved time synchronization without increasing the transmission overhead of the signal, thereby increasing overall data transmission efficiency.

BRIEF DESCRIPTION OF THE DRAWINGS

These and other features and advantages of the present invention will become apparent from reading the following detailed description in conjunction with the drawings, in which:

FIG. 8 is a block diagram of timing recovery circuit according to the invention.

FIG. 9 illustrates an embodiment wherein a plurality of timing recovery functions are combined.

DETAILED DESCRIPTION OF THE PREFERRED EMBODIMENTS

Figure 1:
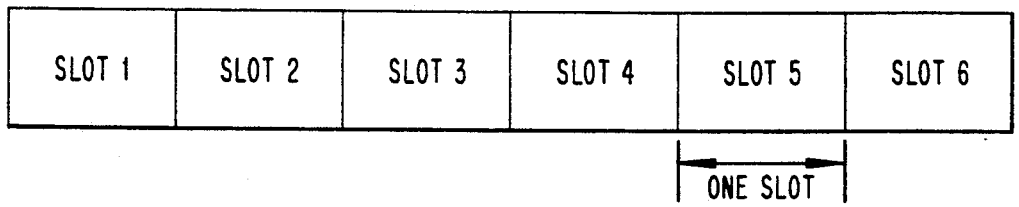
FIG. 1 shows a typical frame format in a transmitted signal which is processed in accordance with the invention.

FIG. 1 illustrates a typical frame within a transmitted signal according to the TIA standard IS-54 format. Although this standard has been selected to illustrate the operation of the invention, those skilled in the art will recognize that the time synchronizing method disclosed herein may be applied to data transmitted in any format. Accordingly, each frame comprises six slots which include data from a plurality of signals transmitted by different mobile stations or transmitted to a plurality of different mobile stations from the base station. Each full rate traffic channel uses the data fields in two equally spaced time slots of the frame (e.g., 1 and 4, 2 and 5, or 3 and 6).

Figure 2:
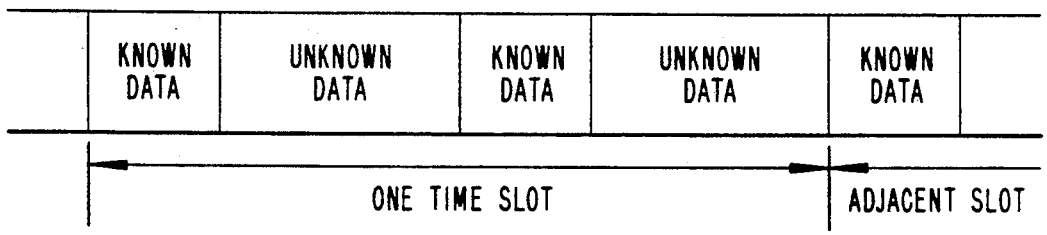
FIG. 2 illustrates a general format of a time slot within a frame.

Each of these time slots include data which is known to the receiver prior to the reception of the transmitted signal and data which is unknown. This characteristic is diagrammatically illustrated in FIG. 2. The format of a time slot varies depending on whether it is transmitted by the base station or by a mobile station. Each of these specific formats is described below with respect to FIGS. 3 and 4.

Figure 3:
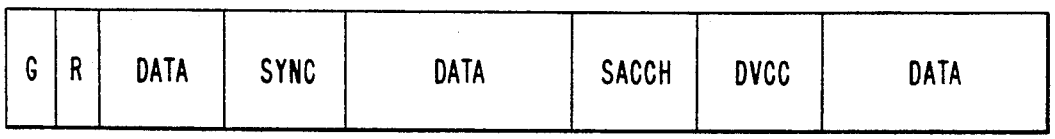
FIG. 3 shows a detailed slot format of a typical signal transmitted from a mobile station to a base station.

With reference to FIG. 3, the time slot format of a signal transmitted by a mobile station will now be described. The six bit G and R fields represent guard and power ramp up intervals, respectively. The G field represents a guard time used to separate the present transmission burst from the previous transmission burst, and the R field represents a ramp time necessary to fully activate the radio transmitter. The three DATA fields hold the channel data, such as voice information. The SYNC field is a 28 bit field containing a sequence which has been chosen to have good correlation properties and may be used, for example, in symbol synchronization, equalizer training and slot identification. The Slow Associated Control Channel (SACCH) is a signalling channel for transmission of control and supervision messages between the mobile station and the system. Lastly, the Coded Digital Verification Color Code (CDVCC) field is used to distinguish the current traffic channel from traffic co-channels.

Figure 4:
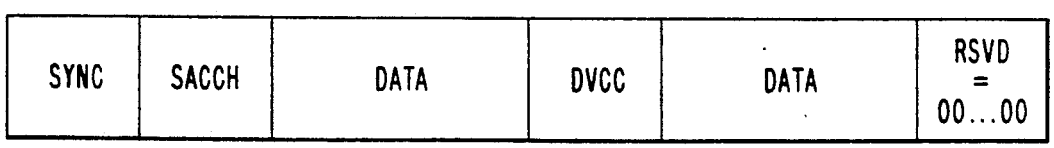
FIG. 4 shows a detailed slot format of a typical signal transmitted from a base station to a mobile station.

The base station uses a slightly different format than that of the mobile station for transmitting signals, as shown in FIG. 4. Therein, the SYNC, SACCH, DATA, and CDVCC fields function in the same way as the similarly labelled fields described with respect to FIG. 3. The time slots sent by the base station do not require the guard and power ramp up fields which are necessary in the time slots transmitted in bursts by the mobile stations, thus these fields are omitted and a 12 bit space, RSVD, has been reserved in each slot for future use.

As mentioned, above, one of the purposes of the SYNC field in each time slot is to time synchronize each slot and obtain the optimal sampling point as a reference prior to demodulation. This is typically done by correlating the received signal with the known SYNC field and using the peak of the correlation function as an optimal sampling point. With the time synchronization method and apparatus according to the invention, however, the improved method of synchronization includes the use of one or more additional sequences of known data symbols. For example, with respect to the signal transmitted from the base station to a mobile station, the additional known data sequence can be the synchronization field from the following time slot or it can be the CDVCC field. In signals transmitted by the mobile stations to the base station, only the CDVCC field may be used as the additional known data because the SYNC fields of adjacent slots are transmitted by other mobile stations.

The CDVCC field, as discussed above, was originally provided to distinguish between current traffic channels and traffic co-channels. As discussed in more detail in commonly assigned U.S. Pat. No. 5,008,953, herein incorporated by reference, the voice color code allows the base station which is responsible for a connection to distinguish between a mobile station which is a party to the connection and an interfering mobile station which is using the same radio channel. More importantly for the purposes of the present invention, the CDVCC data for each time slot is known to the receivers of both the mobile station and the base station prior to decoding because it has already been received in either a Traffic Channel Designation message or a Handoff message.

Sample timing recovery is accomplished by buffering the received signal and calculating the sampling position using the two or more known data sequences. First, a channel impulse response estimate for each known sequence, S, is generated. The impulse response estimates are then used to generate timing recovery functions. If, for example at the receiver of the mobile stations, the synchronization sequences of adjacent time slots are chosen as the known data sequences, the correlation functions of these synchronization fields can be used as the impulse response estimates from which the timing recovery functions are then derived. A block diagram of a circuit used to generate the correlation function of a known data sequence to a received signal is illustrated in FIG. 5 and discussed in more detail below.

In the receiver of the base station, however, the synchronization field and CDVCC field must be used as additional known data sequences since each successive synchronization field is generated by different mobile stations. In that case, the correlation function of the CDVCC field requires further processing to achieve an impulse response estimate because the CDVCC field may not have good correlation characteristics. This processing is described in conjunction with FIG. 6, below.

Figure 5:
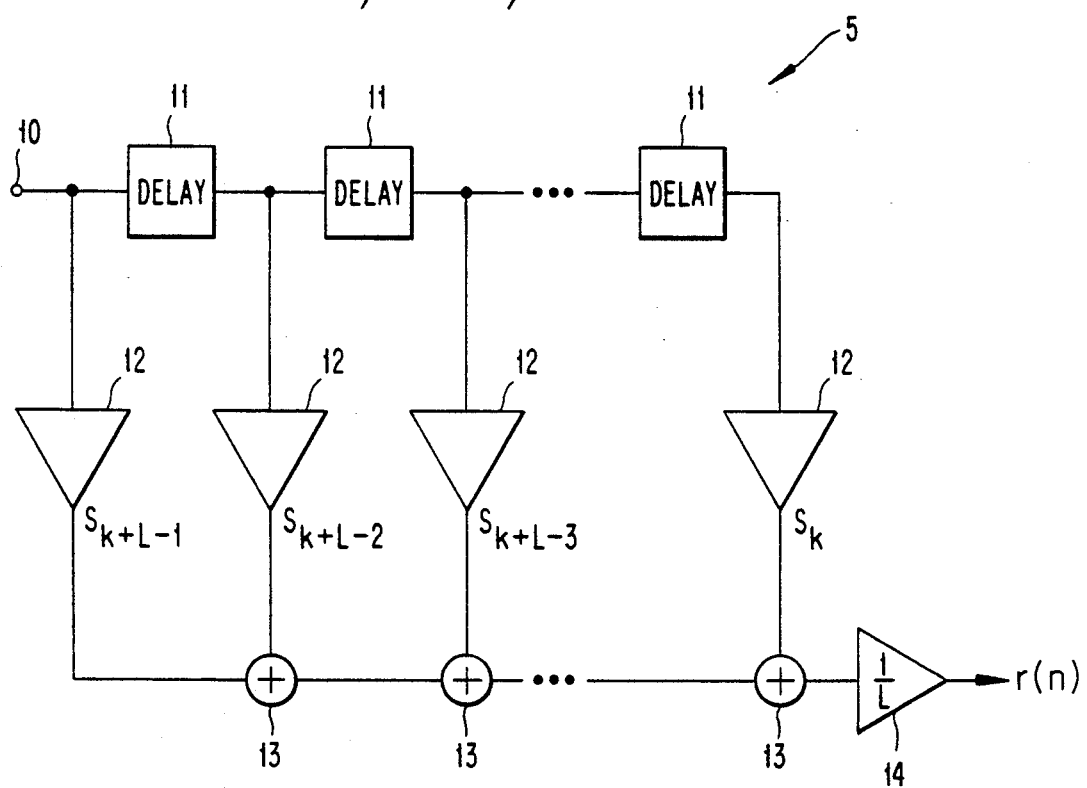
FIG. 5 is a block diagram of a correlation circuit according to the invention.

FIG. 5 illustrates a transversal filter 5 used to generate the correlation function between a received signal and the known data symbols within that signal. As explained above, this correlation function is one of the functions which may be used as the impulse response estimate in generating a timing recovery function. In this circuit, the complex conjugate of the received signal is applied to the input 10. The complex conjugate may be represented by the formula $y^*(n+u(k+L-1))$ where:

u = The number of samples per symbol period;
L = The number of known data symbols used in the correlation; and
k = The index of the first known symbol in the correlation.

Each symbol is multiplied with the complex valued representation of the known data symbol, these terms are summed and the result is divided by the total number of known data symbols used in the correlation. Accordingly, each of the blocks 11 comprise u delay elements having a total delay of one symbol period. After each delay the signal line is tapped and the complex conjugate of the received signal is multiplied with the appropriate portion of the complex valued representation of the known data symbol, in this case one of the synchronization sequence symbols, at each of the complex amplifiers 12. This result is added to each of the previous results and the total is divided by the number of symbols L used in the correlation to arrive at the correlation function $r(n)$. Thus, according to one embodiment of the invention, each of the known sequences of adjacent time slots would be processed in this fashion.

Figure 6:
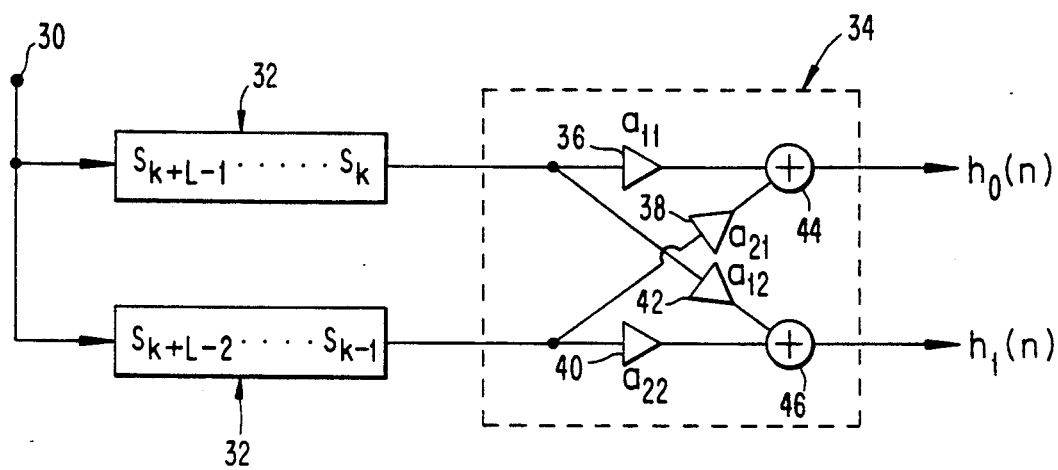
FIG. 6 is a block diagram of a circuit for generating a channel impulse response estimate according to the invention.

A circuit for generating an impulse response estimate using a known sequence, S, is shown in FIG. 6. By way of example, in this embodiment the number of taps of an equalizer in the receiver has been selected to be $n=2$. Note, however, that if no equalizer is provided in the receiver, the number of taps would then be $n=1$ and only one impulse response estimate component, $h_0(n)$, would be generated. In FIG. 6, the complex conjugate of the received signal, $y^*(n+u(k+L-1))$, is input at 30. The complex conjugate is then correlated at blocks 32, each of which represent a correlator as discussed above and illustrated in FIG. 5.

The correlation of the known sequence, S, is then multiplied with the complex conjugate of the inverse auto correlation matrix of the known sequence, S, by the complex amplifiers and adders generally indicated at 34. In this example, the complex conjugate of the inverse auto correlation matrix of the known sequence, S, is represented by the matrix:

$$A = \begin{bmatrix} a_{11} & a_{12} \\ a_{21} & a_{22} \end{bmatrix}$$

At amplifier 36, the appropriate coefficient of the correlated function is multiplied by coefficient $a_{11}$ and at adder 44 is summed with the product produced at amplifier 38 of another coefficient of the correlated function with coefficient $a_{21}$. Similarly, the products produced at amplifiers 40 and 42 are summed at adder 46. The result, for a receiver having a two tap equalizer, is the impulse response estimate $h(n)$ having components $h_0(n)$ and $h_1(n)$. The multiplication with the inverse auto correlation matrix of the known sequence, S, provides the impulse response estimate when the known sequence does not have good correlation properties, as in the case of the CDVCC sequence.

Figure 7:
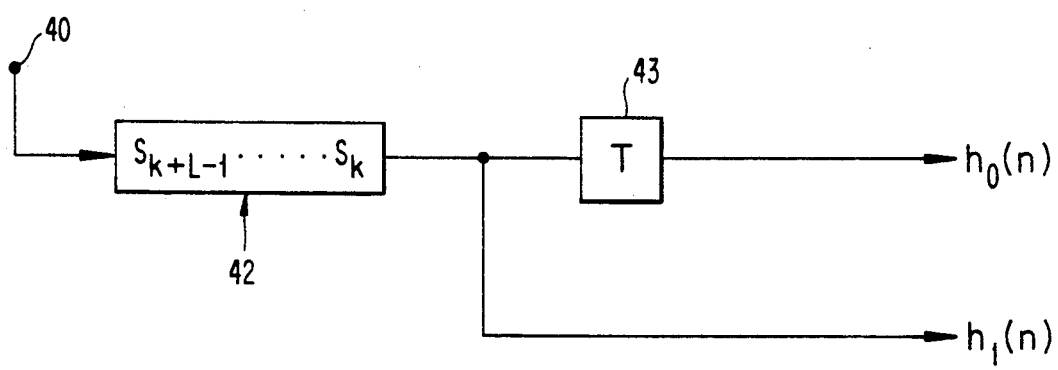
FIG. 7 is a block diagram of another embodiment of a circuit for generating a channel impulse response estimate.

Alternatively, if the known sequence has good correlation properties (i.e., an auto correlation matrix that equals or approximates the identity matrix), the circuit of FIG. 7 can be used to generate the impulse response estimate. For example, this circuit can be used when the known sequence is a synchronization field. In FIG. 7, the complex conjugate of the received signal is input at 40. Block 42 represents the correlator of FIG. 5 where the correlation function of the signal is derived. The impulse response estimate, h(n), comprises a first component, $h_0(n)$, wherein the correlation function of the known sequence is delayed by one symbol period at the delay element 43 and a second component, $h_1(n)$, which is an undelayed version of the correlation function.

A timing recovery function, f(n), is then generated from the impulse response estimate as illustrated in FIG. 8. The two components of the impulse response estimate, $h_0(n)$ and $h_1(n)$, are input at 50 and 52, respectively. Each of these components is squared at blocks 54 and summed at adder 56. Next, the sum is normalized at amplifier 58 by multiplying the sum by a normalization value, 1/K, where K may, for example, be:

$$K = \frac{\sum_{n \in W} |y(n + u(k + L - 1))|^2}{\sum_{n \in W} |h_o(n)|^2} \text{ or,}$$

ps where W = an appropriate window. This normalization allows the resultant timing recovery function f(n) to be combined with other similar functions.

Another way of generating a timing recovery function is to calculate the accumulated squared error signal resulting from an equalizer run in the training or reference directed mode. This procedure is repeated for different positions, n, and thus a timing recovery function is formed. A value of n which minimizes this timing recovery function is chosen as the sampling point. Alternatively, a combination of similar timing recovery functions can be derived from equalizer training over a plurality of known sequences and the position n that minimizes the composite function is selected as the sampling point.

One of the advantages of using two or more known data patterns in symbol synchronization is that even though time shifting may occur even within each slot, a plurality of timing recovery functions are generated for various time positions within each slot in order to correct for this shifting. Accordingly, demodulation may be performed, for example, based on a combination (e.g. linear combination) of the plurality of timing recovery functions which generate a single sampling point. FIG. 9 illustrates such a combination where three timing recovery functions are used to generate a combined timing recovery function, $f_{tot}(n)$. Of course the number of timing recovery functions will correspond to the number of known sequences used in the synchronization process and may be two or more than three. A time index n which either maximizes, for example when the timing recovery functions are generated from correlation functions, or minimizes, for example when the timing recovery functions are generated from equalizer error functions, the combined timing recovery function derived from a plurality of known sequences is then chosen as the sampling point.

Alternatively, demodulation can be performed using different optimal sampling points derived from different timing recovery functions, depending on which corresponding known data sequence is closest to the current demodulation position within the time slot. A still further way to improve demodulation using the plurality of timing recovery functions to generate a plurality of optimal sampling points, is to perform a separate demodulation of each slot for each sampling point and to then combine the demodulated data according to some criterion, such as the least sum of squared errors generated during equalizer training or the path metrics if a Viterbi detector is used.

As seen from the foregoing description, the present invention provides improved time synchronization of signals by using more than one known data pattern to generate a plurality of timing recovery functions. These timing recovery functions are then used to find one or more reference sampling points to demodulate the received signal. Another important aspect of the invention is that the improvement of time synchronization does not come at the expense of increased transmission overhead. Since the time synchronization method according to the invention is performed using data patterns already present in each time slot, such as the CDVCC field and following slot's synchronization field, no additional synchronization words are added. To add such further synchronization words would reduce the ratio of data bits to non-data bits per frame and impair transmission efficiency.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

We claim:

1. A method of time synchronizing and demodulating a received data signal comprising the steps of:

providing at least two data sequences in said received data signal which are known to a receiver for each set of data fields to be demodulated, wherein said at least two data sequences include at least one synchronization sequence having good correlation properties and at least one sequence which does not have good correlation properties;

calculating a timing recovery function for each of said at least two data sequences;

finding, based on the calculated plurality of timing recovery functions, at least one sampling point; and demodulating each set of data fields of said received data signal using the resulting at least one sampling point as a reference for the demodulating position.

2. The method of time synchronizing of claim 1 wherein said step of demodulating further comprises the steps of:

determining a single sampling point using a combination of said plurality of timing recovery functions; and using said single sampling point as a reference point for demodulating the set of data fields.

3. The method of time synchronizing of claim 2 wherein said combination is a linear combination.

4. The method of time synchronizing of claim 1 wherein said step of demodulating further comprises the steps of:
  choosing one of said at least one sampling points which was calculated from a known data sequence closest to a current demodulation position within the set of data fields;
  using the chosen sampling point as a reference point for demodulating the set of data fields at the current demodulation position;
  incrementing the current demodulation position; and
  continuously repeating said choosing, using and incrementing steps for each demodulation position within the set of data fields.

5. The method of time synchronization of claim 1 wherein said step of demodulating further comprises the steps of:
  demodulating said set of data fields once for each of said at least one sampling points, each time using a different one of said sampling points as a reference for demodulating said set of data fields; and
  combining said plurality of demodulated signals based on a predetermined criterion.

6. The method of time synchronization of claim 5, wherein said predetermined criterion is a least sum of squared errors.

7. The method of time synchronizing of claim 1, wherein said step of providing further comprises the step of:
  wherein said at least one sequence which does not have good correlation properties is also used for a purpose other than synchronization, but remains constant during transmission of said received data signal.

8. The method of time synchronizing of claim 7 further comprising the step of:
  distinguishing a current traffic channel from a traffic co-channel using said at least one sequence which does not have good correlation properties.

9. A method of time synchronizing and demodulating a received time slot within a frame in a communication signal between base and mobile stations in a mobile, cellular telephone system comprising the steps of:
  providing two or more data sequences which are known to a receiver in said time slot, wherein at least one of said data sequences is a synchronization sequence having good correlation properties and at least one of said data sequences is a control sequence which does not have good correlation properties;
  calculating a timing recovery function for each of two or more of said data sequences; and
  demodulating said time slot of said communication signal using one or more sampling points derived from said timing recovery functions.

10. The method of time synchronizing of claim 9 wherein said step of demodulating further comprises the steps of:
  determining a single sampling point using a combination of said plurality of timing recovery functions; and
  using said sampling point as a reference point for demodulating the set of data fields.

11. The method of time synchronizing of claim 10 wherein said combination is a linear combination.

12. The method of time synchronizing of claim 9 wherein said step of demodulating further comprises the steps of:
  choosing one of said one or more sampling points which was calculated from a known data sequence closest to a current demodulation position within the time slot;
  using the chosen sampling point as a reference point for demodulating the time slot;
  incrementing the current demodulation position; and
  continuously repeating said choosing, using and incrementing steps for each demodulation position within the time slot.

13. The method of time synchronization of claim 9 wherein said step of demodulating further comprises the steps of:
  demodulating said time slot once for each of said one or more sampling points, each time using a different one of said sampling points as a reference point for demodulating said time slot; and
  combining said plurality of demodulated signals based on a predetermined criterion.

14. The method of time synchronization of claim 13 wherein said predetermined criterion is a least sum of squared errors.

15. The method of time synchronization of claim 9 wherein said timing recovery function is derived from a correlation function for each of said known data sequences.

16. The method of time synchronization of claim 9 wherein said predetermined function is an error signal generated during equalizer training for each of said known data sequences.

17. The method of time synchronizing of claim 9, wherein said control sequence is also used for a purpose other than synchronization, but remains constant during transmission of said received data signal.

18. The method of time synchronization of claim 17, further comprising the step of:
  distinguishing a current traffic channel from a traffic co-channel using said at lest one sequence which does not have good correlation properties.

19. A system for time synchronizing and demodulating received data signal in a time division multiple access system wherein a time slot of said received data signal includes at least two known data sequences, wherein said at least two known data sequences include at least one synchronization sequence having good correlation properties and at least one sequence which does not have good correlation properties, said system comprising:
  means for calculating, for each of said at least two known data sequences, a predetermined function, and also for calculating at least one sampling points based on said predetermined functions; and
  means for demodulating said time slot of said received data signal using one or more of the sampling points.

20. The system for time synchronization of claim 19 wherein said means for demodulating further comprises:
  means for combining said timing recovery functions to determine a sampling point; and
  means for using said sampling point as a reference point for demodulating the time slot.

21. The system for time synchronization of claim 19 wherein said means for demodulating further comprises:
  means for choosing one of said at least one sampling points which was calculated from a known data sequence closest to a current demodulation position within the time slot;

means for using the chosen sampling point as a reference point for demodulating the time slot;

means for incrementing the current demodulation position; and means for continuously repeating said choosing, using and incrementing steps for each demodulation position within the time slot.

22. The system for time synchronization of claim 19 wherein said demodulating means further comprises:

means for demodulating said time slot once for each of said at least one sampling points, each time using a different one of said sampling points as a reference point for demodulating said time slot; and means for combining said plurality of demodulated signals based on a predetermined criterion.

23. The system of time synchronization of claim 19, wherein said at least one sequence which does not have good correlation properties is also used for a purpose other than synchronization, but remains constant during transmission of said received data signal.

24. The system of time synchronization of claim 23 further comprising:

means for distinguishing a current traffic channel from a traffic co-channel using said data field.

* * * * *